United States Patent
Wieland

(10) Patent No.: US 8,825,911 B1
(45) Date of Patent: *Sep. 2, 2014

(54) METHOD FOR CREATION OF DEVICE DRIVERS AND DEVICE OBJECTS FOR PERIPHERAL DEVICES

(71) Applicant: Open Invention Network LLC, Durham, NC (US)

(72) Inventor: Martin Wieland, Munich (DE)

(73) Assignee: Open Invention Network, LLC, Durham, NC (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/044,086

(22) Filed: Oct. 2, 2013

Related U.S. Application Data

(63) Continuation of application No. 12/711,462, filed on Feb. 24, 2010, now Pat. No. 8,554,957.

(51) Int. Cl.
*G06F 3/00* (2006.01)

(52) U.S. Cl.
USPC .............................................. 710/8; 719/321

(58) Field of Classification Search
None
See application file for complete search history.

(56) References Cited

U.S. PATENT DOCUMENTS

| | | | |
|---|---|---|---|
| 5,339,432 A * | 8/1994 | Crick | 713/1 |
| 6,081,850 A * | 6/2000 | Garney | 710/15 |
| 6,263,387 B1 * | 7/2001 | Chrabaszcz | 710/302 |
| 2003/0070063 A1 * | 4/2003 | Boyle et al. | 713/2 |
| 2003/0088711 A1 * | 5/2003 | Tabares et al. | 709/321 |
| 2003/0132956 A1 * | 7/2003 | Duncan et al. | 345/735 |
| 2003/0225928 A1 * | 12/2003 | Paul | 709/321 |
| 2004/0230710 A1 * | 11/2004 | Goodman | 710/8 |
| 2005/0257226 A1 * | 11/2005 | Belvin et al. | 719/328 |

* cited by examiner

*Primary Examiner* — Elias Mamo
(74) *Attorney, Agent, or Firm* — Haynes and Boone, LLP

(57) ABSTRACT

All steps required to create and operate a peripheral device of an electronic device can be performed without the need to plug in the peripheral device to the electronic device. Setup information for a peripheral device is extracted, modified and stored to fit to a physical existent peripheral device. The modified setup information is used to create a data structure that is passed to the peripheral bus driver. As the data structure contains a hot plug notification the reception causes the peripheral bus driver to initiate the setup process for the peripheral device. As the data structure is built from setup information that is available at the electronic device no additional user action is required. The invention also allows the creation of a device object for existing signed driver packets that may not be altered.

20 Claims, 6 Drawing Sheets

METHOD FOR CREATION OF DEVICE DRIVERS AND DEVICE OBJECTS FOR PERIPHERAL DEVICES

CROSS-REFERENCE TO RELATED APPLICATIONS

This application is a continuation of application Ser. No. 12/711,462, entitled "METHOD FOR CREATION OF DEVICE DRIVERS AND DEVICE OBJECTS FOR PERIPHERAL DEVICES", filed on Feb. 24, 2010, now issued U.S. Pat. No. 8,554,957, issued on Oct. 8, 2013, the entire contents of are hereby incorporated by reference.

TECHNICAL FIELD OF THE INVENTION

The present invention relates to a method for connecting an electronic device to a peripheral device generally and, more particularly, to a method for creation and setup of a device driver for peripheral devices that do not have a driver that matches the device identifier of the peripheral device.

BACKGROUND OF THE INVENTION

A hardware abstraction layer (HAL), in modern operating systems, is interposed between physical hardware and operating system (OS). The hardware abstraction layer (HAL) is an abstraction layer, implemented in software, between the physical hardware of a computer and the software that runs on that computer. Its function is to hide differences in hardware from most of the operating system kernel, so that most of the kernel-mode code does not need to be changed to run on systems with different hardware. On a electronic device such as a computer, HAL can basically be considered to be the driver for the motherboard and allows instructions from higher level computer languages to communicate with lower level components, such as directly with hardware. Open source operating systems, and some other portable operating systems also have a HAL, even if it's not explicitly designated as such. Some operating systems, such as Linux, have the ability to insert one while running. Popular expansion buses which are used on more than one architecture are also abstracted, such as ISA, EISA, PCI, PCI-E allowing, from the OS manufacturers point of view, drivers to also be highly portable with a minimum of code modification. As the HAL was introduced and is supplied by the manufacturer of the OS the OS, thus its manufacturer gains extensive control of the hardware. The OS is only capable to identify physical existent hardware by specific information held ready and passed by the hardware. A technique that allows to actively build all required information for a peripheral device before it is connected to the electronic device and even is able to morph the physical existent peripheral device into a device desired by the OS is not currently known in the art. However, such technique would offer significant advantages over the prior art.

A device driver, in electronic data processing, is a computer program that allows a higher-level computer program to interact with a hardware device. A device driver typically communicates with the device through the system bus or a communications subsystem to which the hardware is connected. When a calling program invokes a routine in the driver, the driver issues commands to the device. Once the device sends data back to the driver, the driver may invoke routines in the original calling program. Seen from the OS manufacturers point of view, a device driver simplifies programming by acting as an abstraction layer between a hardware device and the application and OS that uses it. The higher-level application code can be written independently of whatever specific hardware device it will ultimately control, as it can interface with it in a standard way, regardless of the underlying hardware. Every version of a device requires its own hardware-specific specialized commands.

In contrast, most applications utilize devices by means of simplified high-level device-generic commands. The device-driver accepts these commands and breaks them into a series of low-level device-specific commands as required by the device being driven. By design device drivers are hardware-dependent and operating-system-specific.

A virtual device driver as disclosed in U.S. Pat. No. 6,968,307 is a particular variant of device drivers. Instead of enabling the OS to dialog with physical existent hardware, a virtual device driver takes the opposite role and emulates a piece of hardware, so that the OS and its application programs have the illusion of accessing real hardware. Attempts by the OS or an application program to access the virtual hardware may also be routed to physical existent hardware.

U.S. Pat. No. 7,571,445 describes a system and method for dynamic device driver support in an open source operating system. This technique introduces a device driver for a computer system that includes an open source operating system, including an open source kernel. The device driver is constructed from an open source service layer and a set of pre-compiled driver modules that can be compiled against the kernel of the operating system. A service layer provides an interface between the kernel of the operating system and a set of applicable driver modules. Although this method allows the usage of one OS service layer for multiple hardware devices hardware specific device drivers for each peripheral device are still needed. A solution for physical existent devices that do not have a driver that matches the device identifier of the device is not included.

U.S. Pat. No. 6,754,725 discloses an USB peripheral that contains its own device driver. The invention concerns a peripheral device comprising a computer readable media and an interface circuit. The computer readable media may be configured to store instructions for operating the peripheral device. The interface circuit may be configured to communicate the instructions to an operating system of a computer in response to connection of the peripheral device to the computer. Although this invention eliminates the need to install a hardware specific device driver from separate media it requires a computer readable media in the device itself therefore making it impossible to use the invention on devices that do not provide such a capability. As the invention still requires a hardware-specific device driver it does not give an acceptable answer to the question how devices that have no such driver can communicate with the computer.

In U.S. Pat. No. 5,794,032 a system for the identification and configuration of computer hardware peripherals is shown that allows the automatic identification and configuration of a computer peripheral. The system uses an initialization program to send one or more query instructions to a peripheral device. In response to the query instructions, the peripheral drive replies with data that can be used to uniquely identify the model number or type of the device. The system then selects the appropriate software driver for the identified peripheral device and loads the selected driver. This approach also requires appropriate hardware specific drivers to be installed on the computer before the peripheral device is plugged in. As the HAL of modern operating systems permits direct hardware access this technique is only applicable for operating systems that do not have such intermediate layer.

U.S. Pat. No. 7,574,713 discloses methods, systems, and computer program products for instantiating a device driver for communication with a device by dynamically associating the device driver at run-time with a device-specific and/or service-specific software component. This may be done by instantiating a device driver for communication with a device by dynamically associating the device driver at run-time with a device-specific software component. The software component contains information that facilitates communication with devices of a specific type. In other embodiments, a device driver is instantiated by defining a plurality of device parameters and associating one or more of the plurality of device parameters with a service. The device parameters that are associated with the service are then dynamically communicated to the device driver at run-time. Thus, a generic device driver may be dynamically configured at run-time to communicate with devices of a particular device type and/or device parameters may be associated with a service and communicated to the device driver. These device parameters that are associated with a particular service and then passed to the device driver may allow the device driver to collect data from a particular device that is relevant to a particular service offering. Although this invention allows ultra flexible access to and configuration of devices it requires the lower level components to be recognized and accessible by the HAL before the methods can come into operation.

U.S. Pat. No. 7,275,118 shows an input/output (I/O) device driver loading method for a data processing system that involves communication of a secondary I/O device driver to a data processing system using a primary I/O device driver. An initial (first) device identification information is passed from the peripheral device to the data processing system. This first device identification information corresponds to a first I/O device driver in the data processing system. By utilizing the invention the device then transmits a second I/O device driver from the peripheral device to the data processing system using the first I/O device driver in the data processing system. A second device identification information is then passed from the peripheral device to the data processing system. Although this method allows the use of simplified generic device class drivers to establish an initial communication with the data processing system to transmit additional device drivers and device identification information to the data processing system it requires the device to be plugged into the data processing system and a hardware specific device driver to be available for the peripheral device. Also this method does not give an acceptable answer to the question on how devices can be installed and used that do not have a hardware specific driver for any of the transmitted device identification information.

U.S. Pat. No. 6,345,319 discloses a setting method for installation of a plug and play device by utilizing the set-up file (INF) of a hardware driver. The method reads the device ID of a new device and copies the driver file of the new device to the corresponding directory. The device ID and all related device class of an already installed (original) device is deleted from the computer's registry. After a restart of the computer the OS displays that a new device is found and automatically establishes the relationship between the new device and the previously installed driver through the new device ID and class in order to let the new device be operated normally.

Although the invention describes a method to make changes to an existing system configuration it requires an already installed compatible device and a hardware-specific device driver for the new device. In addition a restart of the computer is mandatory. The required deletion of existing registry entries most likely will be prohibited by the OS or my lead to serious corruption of the computers registry.

SUMMARY OF THE INVENTION

The present invention provides a way to perform all steps required to build setup information's, install and initialize a peripheral device of an electronic device without the need to plug in the peripheral device to the electronic device. Setup information of a unsigned driver for a peripheral device is extracted, modified and stored to fit to a physical existent peripheral device. The modified setup information is used to create a data structure that is passed to the peripheral bus driver. As signed device drivers must not be altered to keep their functionality the invention also allows the creation of a device object that in further steps is bound to the physical existent peripheral device by changing its relations to the peripheral bus. As the data structure contains a hot plug notification the reception causes the peripheral bus driver to initiate the setup process for the peripheral device. As the data structure or the device object is built from setup information that is available at the electronic device no additional user action is required. If used with a physical existent peripheral device that has multiple functional capabilities the present invention allows to transfer the features of other devices to this device. Some major advantages of the invention are: Devices that do not contain required electronic parts for successful initialization of a setup process may be installed. Compatible devices that do not have an own set of device drivers may use setup data from existent devices. Devices that are compatible but do not have signed drivers may be used in an environment that obligatory requires signed drivers. A device with multiple functional capabilities can lend device information's from already installed devices. Non PnP devices can behave like PnP devices as the initial creation does not require the hardware to be connected.

DETAILED DESCRIPTION OF THE INVENTION

In order to avoid confusion often present in the world of electronic devices jargon, for purposes of the present invention, the following term shall have the meaning set forth below: "BUS" shall mean any device to which other physical, logical, or virtual devices are attached; a bus includes traditional buses such as SCSI and PCI, as well as parallel ports, serial ports, and i8042 ports.

Figure 1:
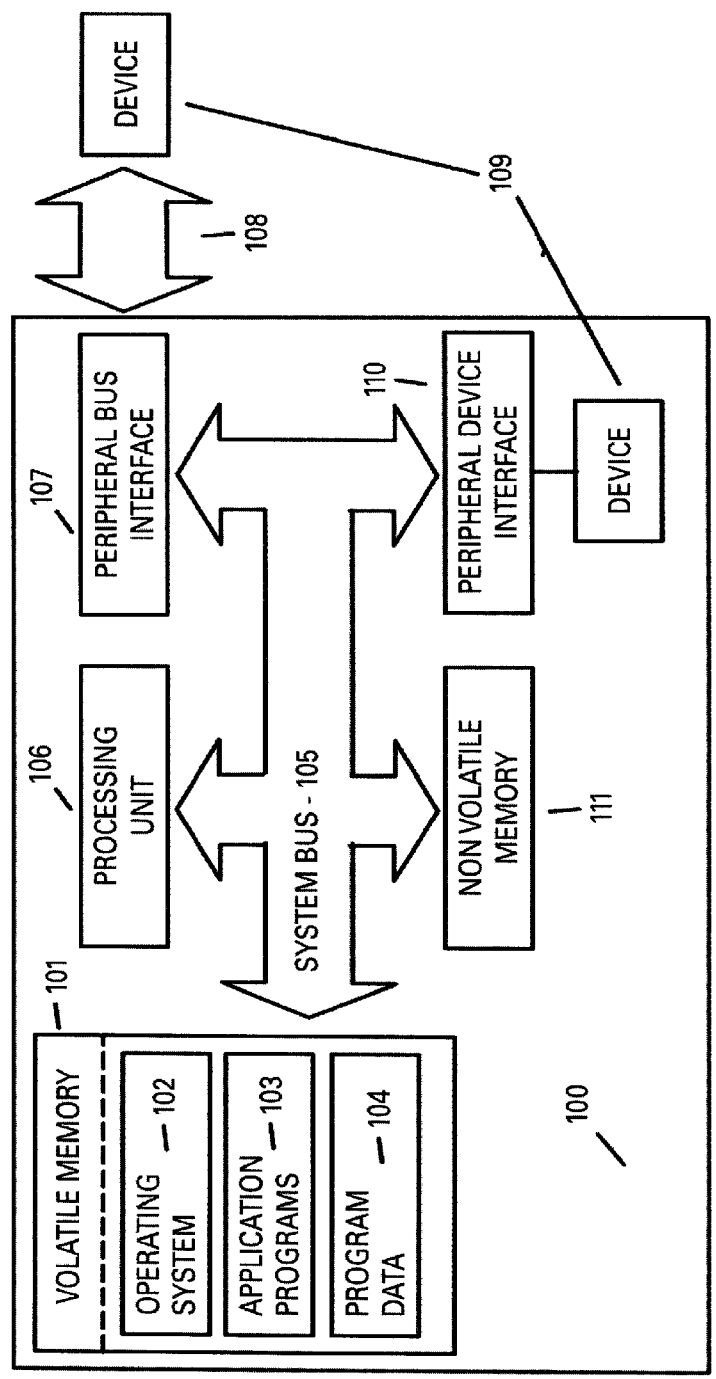
FIG. 1 is a block diagram of an exemplary operating environment.
Figure 2:
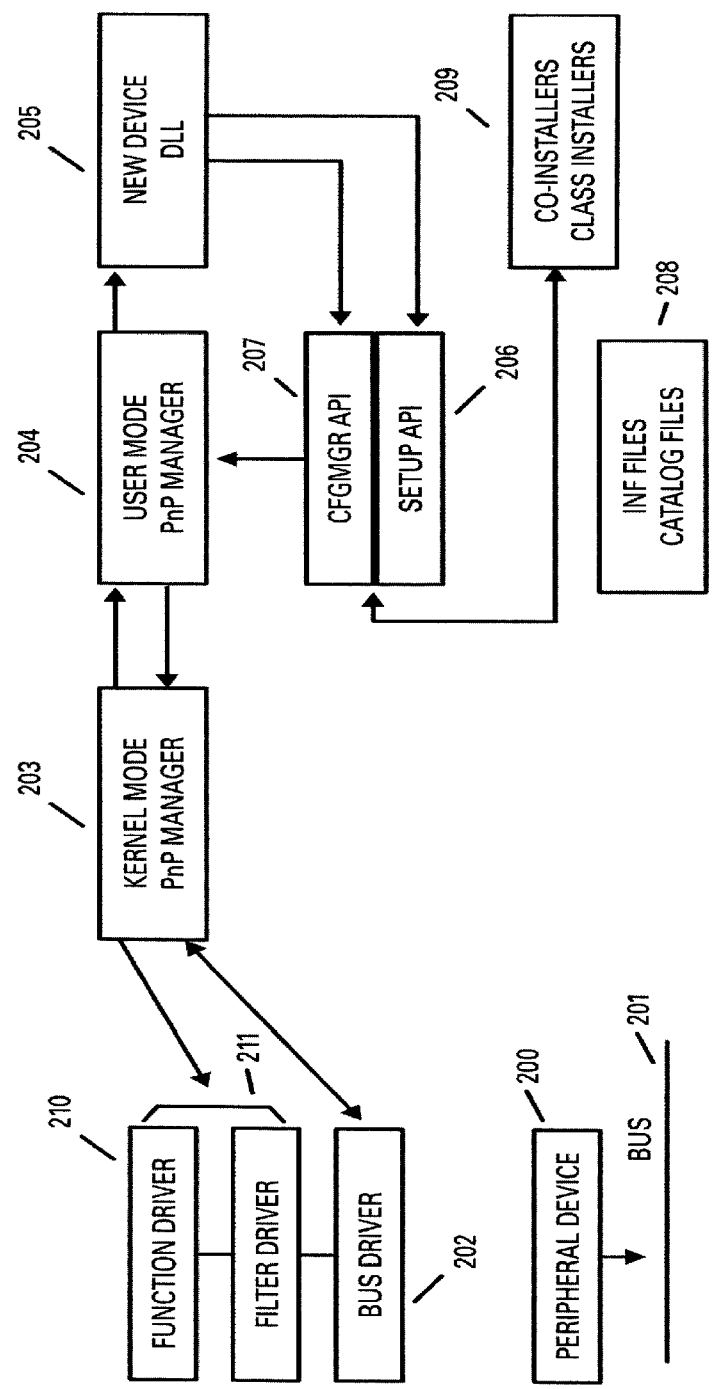
FIG. 2 is a block diagram showing involved components when using the invention with Microsoft Windows Operating Systems.

The invention may be more vividly described with reference to FIGS. 1-3. FIG. 1 is a schematic diagram of a conventional digital electronic device that can be used to implement various aspects of the invention. When a new peripheral device 109 is connected to a peripheral device interface 110 or a peripheral bus 108 that is connected to the system bus 105 by a peripheral bus interface 107, the electronic device 100 detects the presence of the connected peripheral device and a configuration process (e.g., enumeration) begins. An enumeration process assigns a unique address to the connected peripheral device, queries the connected peripheral device about requirements and capabilities, writes data about the connected peripheral device to the OS 102 of the electronic device and loads the appropriate software device driver from a non volatile memory into the OS.

The device driver is a program that allows the OS and application programs 103 to communicate correctly with the peripheral device, provides information to the electronic devices operating system about the peripheral device and allows transfer of program data 104 to the peripheral device.

Figure 3:
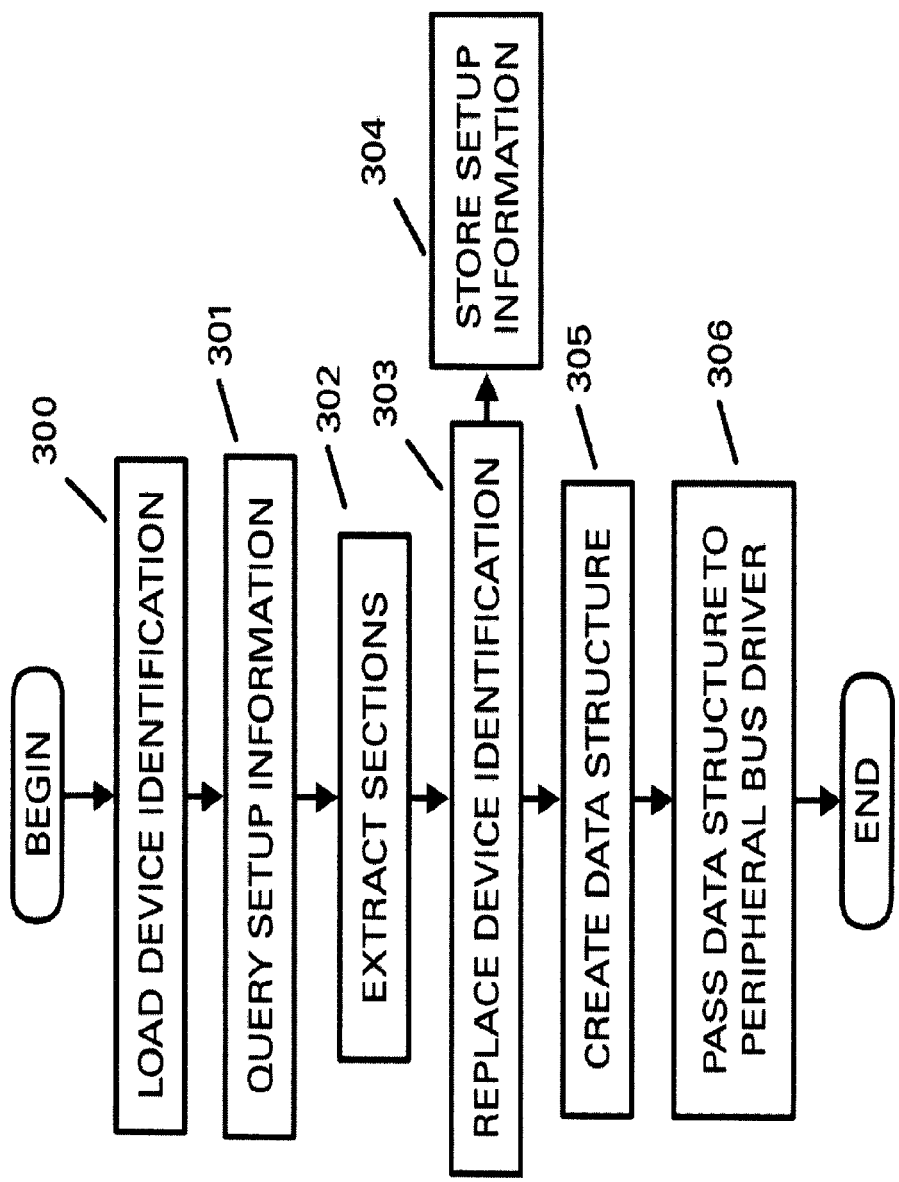
FIG. 3 is a flow chart illustrating a method of creating a device driver and initializing the setup process in accordance with the present invention.

FIG. 3 is a flow chart illustrating a method of creating a device driver and initializing the setup process in accordance with the present invention. Initially the present invention collects information's 301 about a desired device and creates an appropriate setup information file 304 for the device. This may either be done by extracting installation information from an existing device or by utilizing a prebuilt setup information file. Setup information is stored in a plain text file. The plain text file is divided into sections that contain information's about the peripheral device's capabilities, dependencies and requirements. During the setup process the OS loads the setup information file into volatile memory, identifies the sections, reads the content of each section and writes entries to the registry, the configuration database of the electronic device. Instead of making changes to the configuration database of the electronic device the invention uses this method to build a temporary data structure that is required to perform the following steps. The temporary data structure may be held in volatile memory such as a random access memory or be stored to non volatile memory such as a physical storage device. As the OS searches and selects the appropriate setup information file for a peripheral device by comparing the class and the device id of the peripheral device with the class and the device id stored in the setup information file changes of the contents of the data structure are necessary to create a setup information file that fits to the peripheral device. The device id of the extracted or prebuilt setup information file stored in the temporary data structure is exchanged with the device id 300 of the physical peripheral device that should finally be plugged into the peripheral bus. This may either be done by user input or by reading a plain text file which is supplied with the peripheral device and just contains the device id. The content of the modified data structure is used to build the setup information file 304 for the new device. This setup information file is stored to a location were the electronic device expects to find such information.

In the next step, the temporary data structure is used to create a data structure 305 that is needed to initialize the setup process for the new device without the need for the physical device to be plugged into the peripheral bus or interface of the electronic device. As the bus driver of a peripheral bus is accessible and accepts configuration requests from either the peripheral bus or the system bus the configuration request can be formed from the content of the temporary data structure. The request can be built and sent by either an application upon user request or a generic multi purpose device driver or service that automatically starts when the creation of the temporary data structure is finished. The data structure sent to the bus driver contains at least the request to add a new device, the class and the device id both taken from the temporary data structure. The class and the device id allow the proper selection of the setup information file built in the prior step. Reception of this data structure at the peripheral bus driver causes the function driver for the bus device to determine that a new device is on its bus. FIG. 2 is a block diagram showing involved components when using the invention with Microsoft Windows Operating Systems. Passing the data structure to the peripheral bus driver 202 causes actions that are similar to plug a peripheral device 200 into the peripheral bus 201.

If the data structure passed to the peripheral bus driver contains a notification flag and the bus supports hot-plug notification, the method may be applied while the system is running. Now the peripheral device is enumerated. The bus driver 202, targeted by the data structure, receives the hot-plug notification flag of the new device. The bus driver notifies the kernel-mode PnP manager 203 that the list of devices on the bus has changed. In this case, the change is a new device on the bus. The kernel-mode PnP manager queries the bus driver for a list of devices present on the bus by sending a query for Bus Relations. The bus driver responds to the query with a current list of devices on the bus. The kernel-mode PnP manager compares the new list against the previous list and, in this case, determines that there is one new device on the bus.

The kernel-mode PnP manager sends queries to the bus driver to gather information about the new device, such as the device's hardware IDs, compatible IDs, and device capabilities. The kernel-mode PnP manager notifies the user-mode PnP manager 204 that there is a device to be installed. The user-mode PnP manager tries to perform a trusted installation. As the data structure passed to the peripheral bus driver was generated from the setup information file and the setup information file is stored at a location were the electronic device expects the information a server side installation can be performed. The user-mode PnP manager creates a new process using rundll32.exe and launches newdev.dll 205 to install the device.

The new device DLL calls setup API 206 device installation functions and CfgMgr API 207 PnP configuration manager functions to carry out its installation tasks. The new device DLL queries the system to build a list of possible drivers for the device. As the setup information file stored in the previous steps is available on the system and matches the new device, the returned driver list contains the required driver.

Setup uses the Class and ClassGUID entries in the device's INF Version section to determine the device setup class. The setup class determines the class installer and the class co-installers for the device, if any. Device-specific co-installers are listed in the appropriate INF section. Setup transfers control to kernel mode to load drivers and start the device.

Once Setup has selected the driver for the device, copied the appropriate driver files, registered any device-specific co-installers, and registered any device interfaces, it transfers control to kernel mode to load the drivers and try to start the device. The appropriate CfgMgr function sends a request to the user-mode PnP manager, which passes it to the kernel-mode PnP manager. The PnP manager loads the appropriate function driver 210 and any optional filter driver 211 for the device.

The PnP manager calls the Driver Entry routine for any required driver that is not yet loaded. The PnP manager then calls the AddDevice routine for each driver, starting with lowerfilter drivers, then the function driver, and, lastly, any upper filter drivers. The PnP manager assigns resources to the device, if required, and sends a start request to the device's drivers.

After finishing these steps the physical existent peripheral device may be plugged into the peripheral bus. As this device sends a hot-plug notification and its device class and device id fits to the driver installed by the data structure the electronic device assumes that the peripheral device is plugged in and starts it.

As the previously described steps of the present invention alter parts of the initial existent driver package for installation of signed drivers a different approach is needed. If the Operating system detects that at least one file in the signed driver package has been altered since the package was signed it categorizes the drivers as altered. This makes it impossible to perform the desired device installation that can be handled entirely by the Operating System's user-mode and kernel-mode PnP manager components. In such case, for non-administrative and standard users, the Operating System does not prompt the user. It would only automatically install a driver signed by a signing authority but silently refuses to install the altered driver. In some operating systems, in order for a user to access specific content such as HD DVD and other licensed formats, all kernel-mode components on his system must be signed. That means that, if the user tries to install the altered driver, the system is not allowed to play the licensed content.

Figure 4:
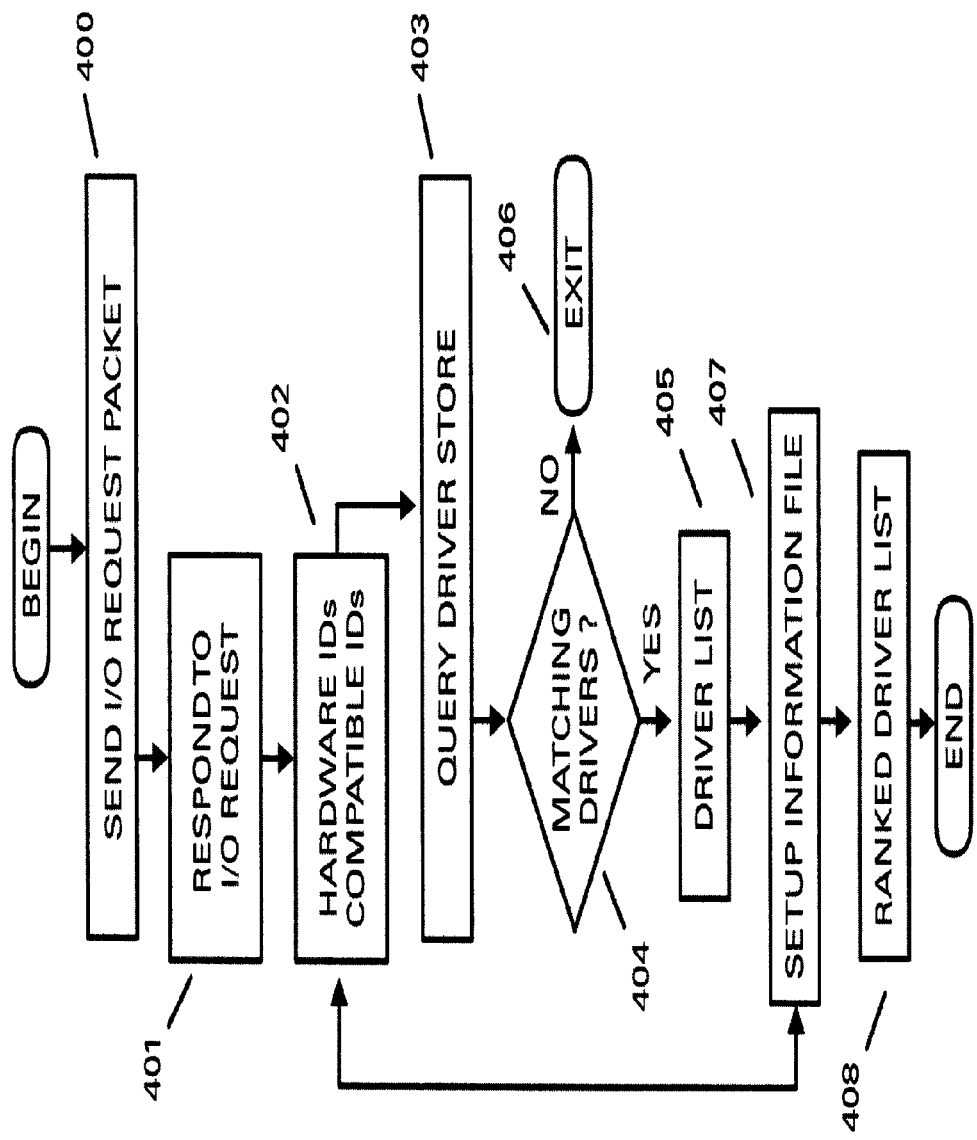
FIG. 4 is a flow chart illustrating a method of ranking a device driver by the Operating System during the setup procedure in a trusted system context without user interaction.
Figure 5:
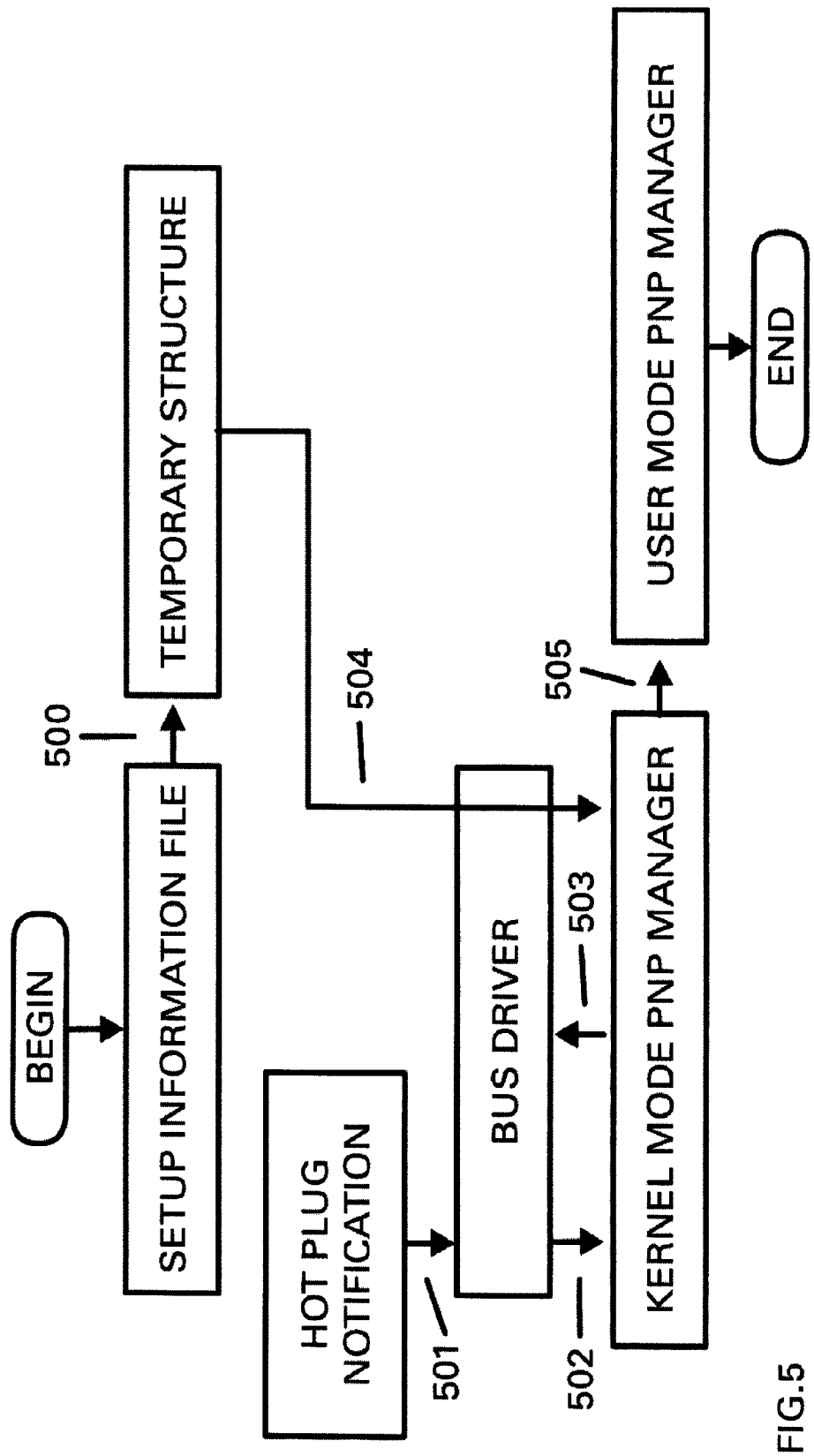
FIG. 5 is a flow chart illustrating a method of extracting setup informations from a signed device driver and initializing the setup process for creation of a device object in accordance with the present invention.
Figure 6:
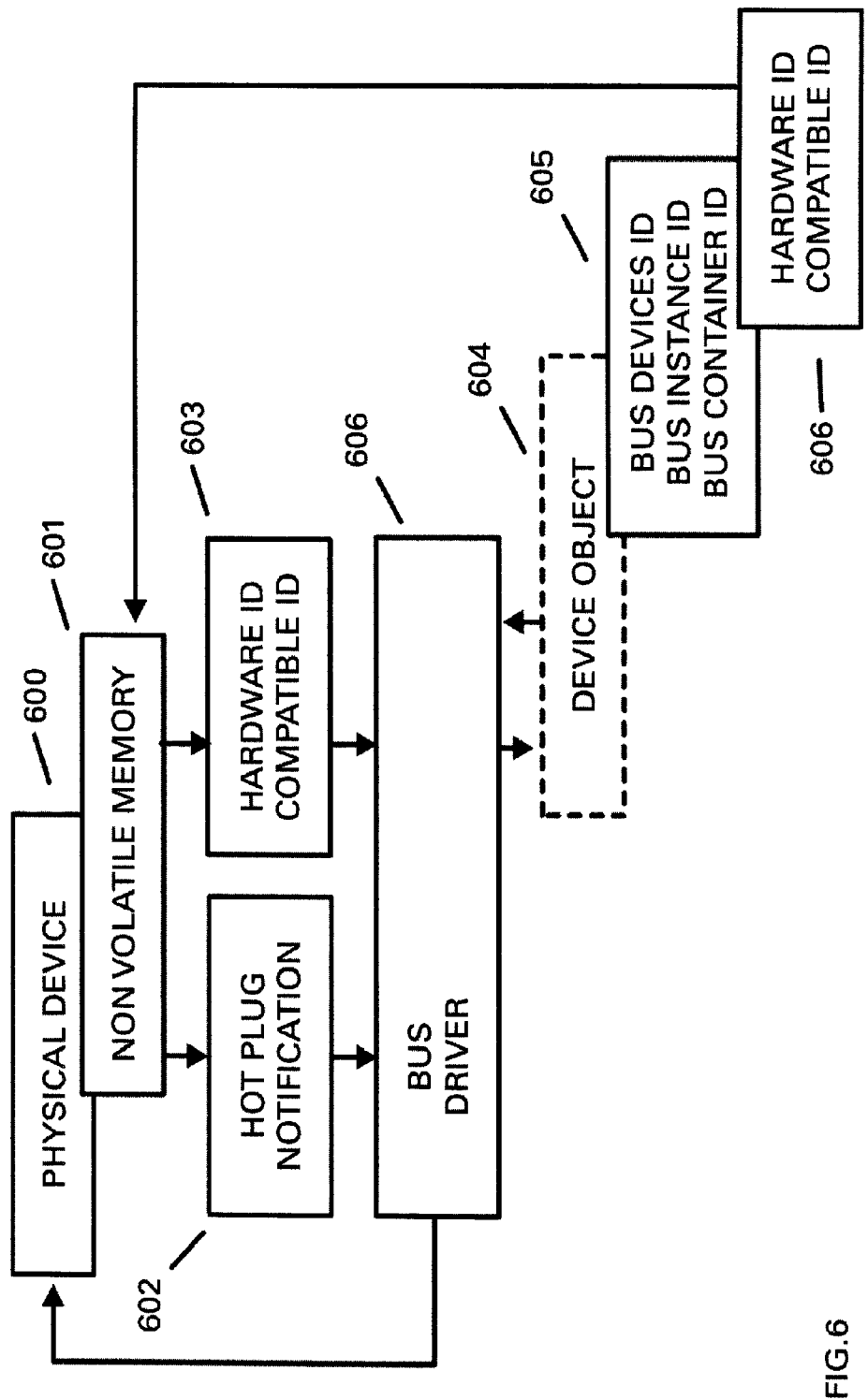
FIG. 6 is a flow chart illustrating a method of binding a physical device to a previously generated device object for a signed driver in accordance with the present invention.

FIG. 4 is a flow chart illustrating a method of ranking a device driver by the Operating System during the setup procedure in a trusted system context without user interaction. Initially, the Kernel Mode Plug and Play Manager sends an I/O Request Packet 400 to the Bus Driver. The Bus driver responds 401 to the request by sending in the Hardware and Compatible IDs 402. Based on this information the setup process queries 403 the Operating Systems driver store or a location where the Operating System expects drivers, such as an INF directory, for matching drivers. If Matching drivers are found 404 they are added to a driver list 405. If the setup process cannot find a matching driver it exits unattended setup mode 406. If drivers are found the setup process compares the content of the setup information files 407 to the device identification strings received in step 404 and builds a driver list with rank indicators 408.

As described in the previous steps the Operating System does not directly interact with hardware. Instead, every piece of hardware is represented by a device object that receives all In- and Output from the Operating System. To successfully use the invention with signed drivers a device object for the device expected by the unmodified signed driver in the Operating System has to be created and, in later steps, bound to the physical existent device that is not attached to the electronic device when the required device object is created.

To successfully collect all necessary data for creating the new device object the setup information file sections of the signed driver and its content are read 500 into a temporary data structure. As already described the creation of the device object is initialized by sending 501 a hot plug notification to the bus driver. The reception of the notification causes the bus driver to notify 502 the Kernel Plug and Play Manager that the list of devices on the bus has changed.

The Kernel Plug and Play Manager sends 503 I/O Request Packets (IRP) to the bus driver to gather informations about the new device. As the bus driver is able to receive commands and data input from the Operating System or an application program and there is no physical device attached to the bus at this point the Plug and Play managers IRP's are answered by sending 504 the previously collected data from the signed device driver in form of strings to the Plug and Play manager via the bus driver that adds, due to the reception of the hot plug notification, some of the required informations like the bus devices ID, bus instance ID or bus container ID. Hardware specific information like the devices hardware ID or its compatible ID are taken from the setup information file. The Kernel Mode Plug and Play manager then notifies 505 the User Mode Plug and Play manager that there is a new device to be installed.

Next a routine to add a device object is started. To build the required parameters this routine uses the information collected in the previous step. The routine is responsible for creating the functional device object 210 or filter device object 211 for the device. The routine contains a pointer to the driver object structure which is the devices signed driver object and a pointer to the physical device object created by the lower level driver.

As simple reading from a file in the driver package does not alter the package the required information to create the appropriate pointers for the routine to add the device object for the expected device is read from the signed driver before the routine is started. The routine contains a pointer to the signed driver and a pointer to the newly arrived physical device object created in the previous steps by the Plug and Play manager.

This routine to add the device calls two other routines that create the device object for use of the signed driver and attach the device to the highest device object in the chain and return a pointer to the previously highest device object. In addition to a pointer to the driver object the first routine contains the driver-determined number of bytes to be allocated for the device extension of the device object, the device type, it's characteristics, information about the devices exclusive access properties and a pointer to a variable that receives a pointer to the newly created device object structure. As all information needed by this routine is taken from the signed device driver installation package various device types can be easyly installed, including but not limited to:

Battery devices and UPS devices, biometric-based personal identification devices and Bluetooth devices. CD-ROM drives, including SCSI CD-ROM drives. In this case, the Operating System's CD-ROM class installer also installs a system-supplied CD audio driver and CD-ROM changer driver, a Plug and Play filter driver. Disk Drives including hard disk drives, display adapters, video adapters, display drivers and video miniport drivers. Floppy disk Controllers and floppy disk drive controllers.

Hard disk controllers, including ATA/ATAPI controllers. Human Interface Devices (HID) including interactive input devices that are operated by the system-supplied HID class driver, which includes USB devices that comply with the USB HID Standard and non-USB devices that use a HID minidriver. IEEE 1284.4 devices that control the operation of multifunction IEEE 1284.4 peripheral devices. IEEE 1284.4 print functions on a Dot4 device that has a single child device, which is a member of the printer device setup class. IEEE 1394 devices that support the 61883 protocol including the 61883.sys protocol driver that transmits various audio and video data streams over the 1394 bus, including quality DV, MPEG2, DSS, and Audio. IEEE 1394 devices that support the AVC protocol device class. IEEE 1394 devices that support the SBP2 protocol device class. IEEE 1394 host controllers connected on a PCI bus. Imaging devices including still-image capture devices, digital cameras, and scanners. IrDA devices including serial-IR and fast-IR NDIS miniports. Keyboards also specified in the (secondary) INF for an enumerated child HID keyboard device. Media changers including SCSI media changer devices. Memory technology drivers including memory devices, such as flash memory cards. Modems and display monitors. An setup information file for a device of this class installs no device driver, but rather specifies the features of a particular monitor to be stored in the registry for use by drivers of video adapters. Mouse devices and other kinds of pointing devices, such as trackballs also specified in the (secondary) INF for an enumerated child HID mouse device. Multifunction Devices including combo cards, such as a PCMCIA modem and netcard adapter. The driver for such a Plug and Play multifunction device is installed under this class and enumerates the modem and netcard separately as its child devices. Multimedia devices including Audio and DVD multimedia devices, joystick ports, and full-motion video capture devices. Multiport serial adapters including intelligent multiport serial cards. Network adapters including NDIS NIC miniport drivers. Network clients including network and/or print providers. Network services such as redirectors and servers. Network transports including NDIS protocols, CoNDIS stand-alone call managers, and CoNDIS clients, as well as higher level drivers in transport stacks. PCI SSL accelerator devices that accelerate secure socket layer (SSL) cryptographic processing. PCMCIA adapters including CardBus host controllers. Ports (COM & LPT ports) including serial and parallel port devices. Printers and bus-specific class drivers including SCSI/1394-enumerated printers. Processors, SCSI and RAID controllers including SCSI HBAs (Host Bus Adapters) and disk-array controllers. Smart Card readers and storage volumes including storage volumes as defined by the system-supplied logical volume manager and class drivers that create device objects to represent storage volumes, such as the system disk class driver. System Devices, including HALs, system buses, system bridges, the system ACPI driver, and the system volume manager driver. Tape drives, including all tape miniclass drivers. USB host controllers and USB hubs. Windows CE USB ActiveSync devices that support communication between a personal computer and a device that is compatible with the Windows CE ActiveSync driver (generally, PocketPC devices) over USB.

The second routine attaches the device to the highest device object in the chain (if any) and returns a pointer to the previously highest device object. the routine contains a pointer to the previously created device object and a pointer to another driver's device object, such as a pointer returned by a preceding call to a routine that returns a pointer to the top object in the named device object's stack.

Due to the fact, that the physical device identification expected by the signed driver is read from the driver and sent to the User Mode Plug and Play Manager a trusted ("server side") silent installation can be performed.

Initially the device object is installed but due to the fact that there is no device plugged into the bus, not started. As the physical existent peripheral device that was used with unsigned drivers, when plugged into the bus, does not send a hotplug notification or other notifications that would initialize an enumeration process additional steps are required to bind the physical device to the device object created in the previous steps in case a signed driver should or has to be used.

To allow binding of a physical device that has no signed drivers but should be used with such drivers the hardware device 600 has to have non volatile memory 601 that provides read- and writeable access to an application program. To allow access and configuration, initially the non volatile memory of the device is programmed to send out a hot plug notification 602 and identification informations 603 for a simple generic device. Non signed drivers for such devices are available and may be silently installed on most common electronic devices. To bind this physical device to the existing but inactive Operating Systems device object 604 for the signed driver package the bus specific informations bus devices ID, bus instance ID and bus container ID 605 for the device object are queried by sending I/O Request Packets to the bus driver 606. Due to the fact that the Operating Systems device object is already installed but not active the Bus relations for this device are known and its Hardware and Compatible ID 606 can be queried, transmitted to and stored in the physical devices non volatile memory. The next time the peripheral device is plugged into the peripheral bus the devices notifications fit to the previously installed Operation System's device object. As the device is already installed it can be used without any further installation steps or user interaction, it just appears as switched ON. The Operating System performs all I/O requests to the Operation Systems device object which is now bound to the physical device.

Although the invention has been described in relation to preferred embodiments, many variations, equivalents, modifications and other uses will become apparent to those skilled in the art. The scope of the present invention should not be limited to the specific disclosure but determined only by the appended claims.

What is claimed is:

1. A method, comprising:
   creating a data structure from existent setup information;
   replacing a device identification (ID) in the data structure with a device ID of a peripheral device;
   passing a request to a device driver of an interface of the peripheral device and a bus that initiates the installation of the peripheral device, wherein the peripheral device is not connected to the electronic device, wherein the request comprises a request to add the peripheral device, a class identifier of the peripheral device and the device ID of the peripheral device which cause a bus driver of the bus to receive the request and determine a new device is operating on the bus as a Plug and Play device; and
   adding entries to provide Plug and Play functionality to the data structure generated from an existent setup information file that does not provide such functionality.

2. The method of claim 1, wherein a previously existent setup information is stored in a file.

3. The method of claim 1, wherein existent setup information is stored in a configuration memory of the electronic device.

4. The method of claim 1, further comprising storing the device ID of the peripheral device.

5. The method of claim 1, further comprising passing an instance ID to the driver of the peripheral interface or bus to identify an instance of the peripheral device.

6. The method according to claim 1, wherein the bus is an expansion bus.

7. The method according to claim 1, wherein the bus is a peripheral bus.

8. The method of claim 1, wherein the peripheral device supports the functionality of multiple devices and the operations of creation of setup information, initialization and performance of an installation are performed for each supported functionality of the multiple devices.

9. An apparatus, comprising:
   a memory; and
   a processor communicably coupled to the memory, the processor configured to:
   create a data structure from existent setup information, replace a device identification (ID) in the data structure with a device ID of a peripheral device;

pass a request to a device driver of an interface of the peripheral device and a bus that initiates the installation of the peripheral device, wherein the peripheral device is not connected to the apparatus, wherein the request comprises a request to add the peripheral device, a class identifier of the peripheral device and the device ID of the peripheral device which cause a bus driver of the bus to receive the request and determine a new device is operating on the bus as a Plug and Play device; and add entries to provide Plug and Play functionality to the data structure generated from an existent setup information file that does not provide such functionality.

10. The apparatus of claim 9, wherein a previously existent setup information is stored in a file.

11. The apparatus of claim 9, wherein existent setup information is stored in a configuration memory of the apparatus.

12. The apparatus of claim 9, wherein the processor is further configured to pass an instance ID to the driver of the peripheral interface to identify an instance of the peripheral device.

13. The apparatus of claim 9, wherein the processor is further configured to pass an instance ID to the driver of the bus to identify an instance of the peripheral device.

14. The apparatus of claim 9, wherein the bus is an expansion bus.

15. The apparatus of claim 9, wherein the bus is a peripheral bus.

16. The apparatus of claim 9, wherein the peripheral device supports the functionality of multiple devices and the operations of creation of setup information, initialization and performance of an installation are performed for each supported functionality of the multiple devices.

17. A non-transitory computer readable medium comprising a computer program that when executed causes a processor to perform:

creating a data structure from existent setup information;

replacing a device identification (ID) in the data structure with a device ID of a peripheral device;

passing a request to at least one of a device driver of an interface of the peripheral device and a bus that initiates the installation of the peripheral device, wherein the peripheral device is not connected to the electronic device, wherein the request comprises a request to add the peripheral device, a class identifier of the peripheral device and the device ID of the peripheral device which cause a bus driver of the bus to receive the request and determine a new device is operating on the bus as a Plug and Play device; and adding entries to provide Plug and Play functionality to the data structure generated from an existent setup information file that does not provide such functionality.

18. The method of claim 1, further comprising creating a device object of the electronic device and binding the device object to the peripheral device to provide a signed driver that is used during the installation of the peripheral device.

19. The apparatus of claim 9, wherein the processor is further configured to create a device object of the apparatus and bind the device object to the peripheral device to provide a signed driver that is used during the installation of the peripheral device.

20. The non-transitory computer readable medium of claim 17, wherein the processor is further configured to perform creating a device object of the electronic device and binding the device object to the peripheral device to provide a signed driver that is used during the installation of the peripheral device.

\* \* \* \* \*